United States Patent
Kumano (10) Patent No.: US 8,575,771 B2
(45) Date of Patent: Nov. 5, 2013

(54) INSTALLATION STRUCTURE FOR HYDROELECTRIC POWER GENERATION APPARATUS

(75) Inventor: Katsuyuki Kumano, Tokyo (JP)

(73) Assignee: Japan System Planning Co., Ltd., Tokyo (JP)

(*) Notice: Subject to any disclaimer, the term of this patent is extended or adjusted under 35 U.S.C. 154(b) by 16 days.

(21) Appl. No.: 12/849,554

(22) Filed: Aug. 3, 2010

(65) Prior Publication Data

US 2011/0025069 A1 Feb. 3, 2011

(30) Foreign Application Priority Data

Aug. 3, 2009 (JP) .................................. 2009-180256

(51) Int. Cl.
*F03B 13/00* (2006.01)
*H02P 9/04* (2006.01)

(52) U.S. Cl.
USPC .............................................. 290/43; 290/54

(58) Field of Classification Search
USPC ................. 290/42, 53, 43, 54; 60/398, 641.7, 60/641.6; 415/3.1, 210.1; 405/75; 416/85, 416/191, 192
See application file for complete search history.

(56) References Cited

U.S. PATENT DOCUMENTS

| | | | | |
|---|---|---|---|---|
| 4,804,855 | A * | 2/1989 | Obermeyer | 290/54 |
| 5,825,094 | A * | 10/1998 | Hess | 290/54 |
| 7,471,009 | B2 * | 12/2008 | Davis et al. | 290/54 |
| 8,022,567 | B2 * | 9/2011 | Davis et al. | 290/54 |
| 2006/0266038 | A1 | 11/2006 | Krouse | |
| 2008/0258467 | A1 * | 10/2008 | Wilson et al. | 290/54 |
| 2009/0134623 | A1 * | 5/2009 | Krouse | 290/43 |

FOREIGN PATENT DOCUMENTS

| | | | |
|---|---|---|---|
| CN | 101592117 A | | 7/2009 |
| GB | 2205615 A | * | 12/1988 |
| GB | 2441822 A | | 3/2008 |
| JP | 54-16046 A | | 2/1979 |
| JP | 5-39773 A | | 2/1993 |
| JP | 7-259064 A | | 10/1995 |
| JP | 2002-127988 A | | 5/2002 |
| JP | 2002-266743 A | | 9/2002 |
| JP | 2007-177797 A | | 7/2007 |
| NL | 1027287 C2 | | 10/2004 |
| WO | 03/056169 A1 | | 7/2003 |
| WO | 2009/088302 A2 | | 7/2009 |

* cited by examiner

*Primary Examiner* — Julio Gonzalez R.
(74) *Attorney, Agent, or Firm* — Tracy M. Heims; Apex Juris, pllc (57) ABSTRACT

An installation structure for a hydroelectric power generation apparatus, includes: a power generation apparatus accommodation frame body in which a plurality of hydroelectric power generation apparatuses are accommodated in parallel; a first wire having one end connected to a lower portion of the power generation apparatus accommodation frame body; an anchor or weight connected with the other end of the first wire; a buoyancy body provided on an upper side of the hydroelectric power generation apparatus accommodation frame body through the second wire, the hydroelectric power generation apparatus accommodation frame body having an upper side opened, and having a dividing plate between both side plates to form a plurality of power generation apparatus accommodation units, each of the plurality of power generation apparatus accommodation units having a running water inlet side window formed at a front portion, and having a running water outlet side window formed at a rear portion.

2 Claims, 6 Drawing Sheets

INSTALLATION STRUCTURE FOR HYDROELECTRIC POWER GENERATION APPARATUS

CROSS REFERENCE TO RELATED APPLICATION

This application claims the benefit of priority to Japanese Patent Application No. 2009-180256, filed Aug. 3, 2009, of which full contents are incorporated herein by reference.

BACKGROUND OF THE INVENTION

1. Field of the Invention

The present invention relates to an installation structure for a hydroelectric power generation apparatus that generates hydroelectric power with flowing water of sea or river.

2. Description of the Related Art

Electrical power generation using the energy of flowing water of sea or river generally presents a challenge as to where a hydroelectric power generation apparatus should be installed. If a hydroelectric power generation apparatus is installed on the surface of water flowing at a high velocity, the water surface on which it is installed may obstruct water transport of ships, etc. Accordingly, installation of a hydroelectric power generation apparatus is generally difficult. If a hydroelectric power generation apparatus is installed at the bottom of the water, flow velocity may be low or lots of mud may be present there, which is unfavorable to a hydroelectric power generation apparatus.

It is, therefore, appropriate to install a hydroelectric power generation apparatus in an undersea or other underwater location that does not obstruct water transport, has sufficient flow velocity and where there is little mud. An example of a conventional hydroelectric power generation apparatus installed in an undersea location is described in Japanese Patent Application No. H07-259064. Various types of hydroelectric power generation apparatus have also been proposed, as described in Japanese Patent Application Laid-Open Nos. H05-39773 and 2007-177797.

Figure 5:
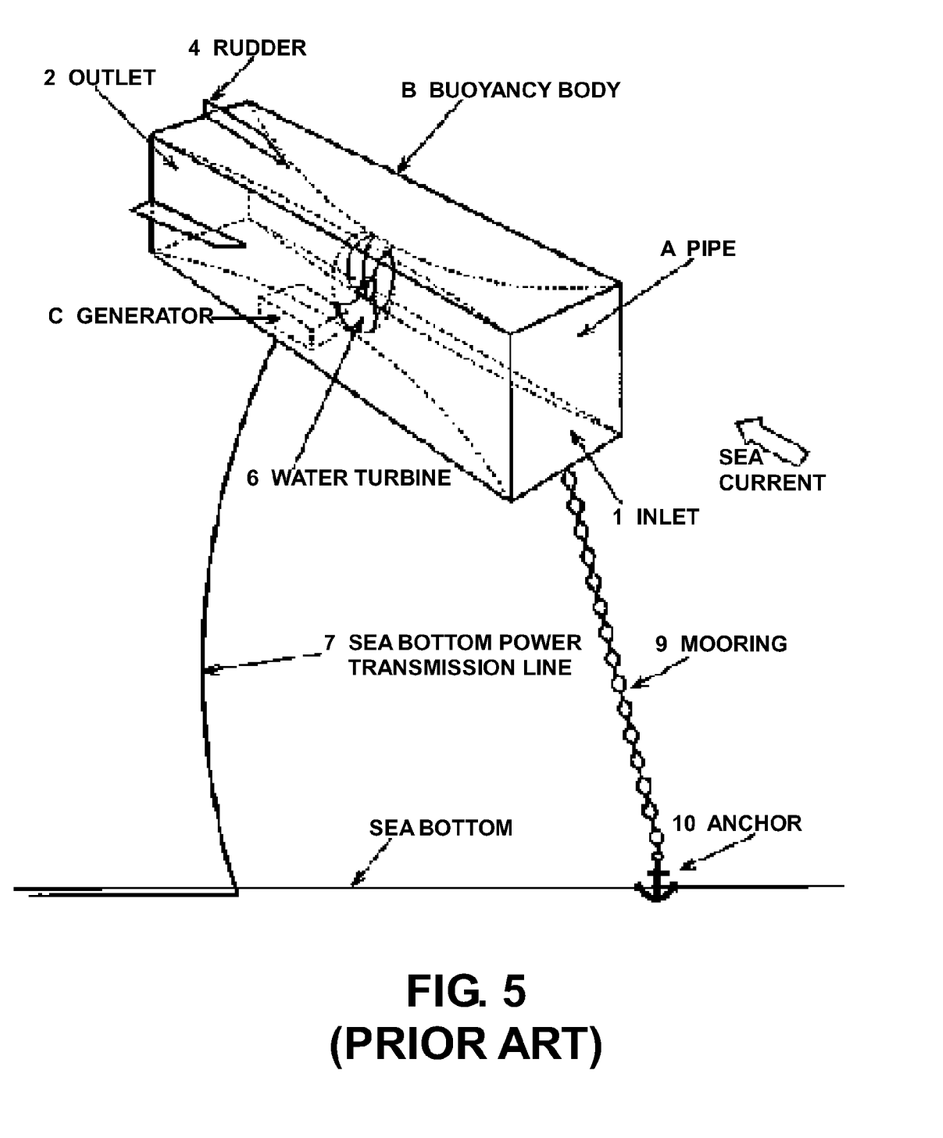
FIG. 5 is a perspective view of a conventional installation structure for a hydroelectric power generation apparatus.
Figure 6:
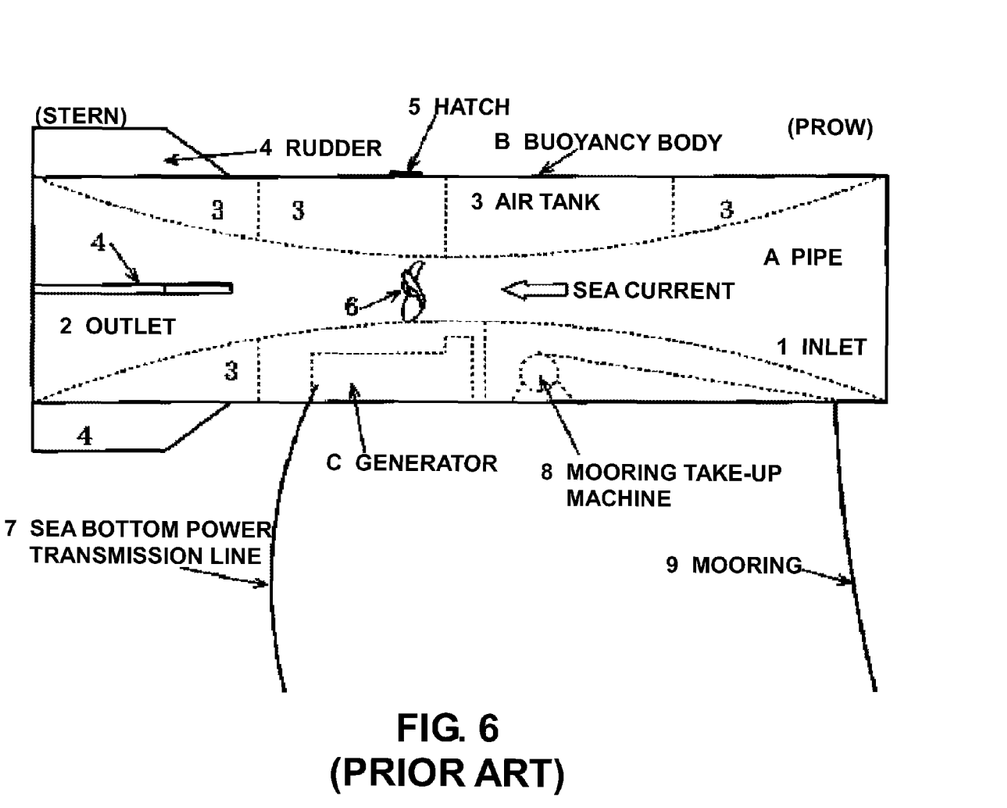
FIG. 6 is a side view of FIG. 5.

The hydroelectric power generation apparatus disclosed in Japanese Patent Application Laid-Open No. H07-259064 has a structure as shown in FIGS. 5 and 6. In an ocean current of stable flow velocity and direction, a buoyancy body B having a generator C and a pipe A facing the flow is moored at a predetermined depth by a mooring 9 and an anchor 10 attached to the prow-area. The buoyancy body B is such that the entire surface of the prow-area is defined as an inlet 1 and that a cross-section (which is perpendicular to the ocean current and in which a water turbine 6 is mounted) of substantially the middle of the pipe A connecting the inlet 1 and the outlet 2 of the prow-area has the shape of a circle reduced in area to one several dozenth of the area of the inlet 1.

Consequently, the flow velocity of the sea current in the place of the water turbine 6 is accelerated by several dozen times of the flow velocity of the sea current in the inlet 1, and great power capacity can be obtained by utilizing the energy of the sea current. The energy of the sea current flowing in the pipe A is then converted into electrical energy by the water turbine 6 and generator C, and this electrical energy is distributed to land by means of a sea bottom power transmission line.

To keep the buoyancy body B horizontal, one closest to a stern among air tanks 3 that are separate from one another in lengthwise, widthwise, and vertical directions, is adjusted to the amount of water it contains. In addition, rudders 4 are provided in upper and lower positions and left and right positions outside the stern, and the inlet 1 in the prow-area is oriented to face the sea current, thereby keeping the position of the buoyancy body B.

A hydroelectric power generation apparatus disclosed in Japanese Patent Application Laid-Open No. H07-259064 adjusts the amounts of water in the plurality of air tanks 3 in order to maintain the horizontal position of the buoyancy body B, and also has the rudders 4. However, if the buoyancy body B is small, this body B may easily be rotated or moved upward or downward or leftward or rightward by a water flow. It may therefore be difficult for the buoyancy body B to be kept horizontal. This requires an increase in the size of the buoyancy body B. Additionally, the integration of the generator C and the buoyancy body B contributes to such a problem as the size of a sea-current power generation submarine (i.e., hydroelectric power generation apparatus) increasing and the cost of each hydroelectric power generation apparatus correspondingly increasing excessively.

In order that the hydroelectric power generation apparatus be balanced relative to the water current, the inlet has to be formed in the shape of a streamer. This results in a very long tunnel-like tube A (i.e., channel) in the direction of water flow. Water may hardly flow into such a long tunnel-like pipe A.

A first object of the present invention is to provide an installation structure for a hydroelectric power generation apparatus that efficiently generates a large quantity of power without increasing the size of the hydroelectric power generation apparatus and that is economical.

A second object of the present invention is to provide an installation structure for a hydroelectric power generation apparatus, which makes it possible to install a plurality of hydroelectric power generation apparatuses such that hydroelectric power generation apparatuses with shorter channels are balanced perpendicular to water flow.

A third object of the present invention is to provide an installation structure for a hydroelectric power generation apparatus that excels in ease of maintenance.

SUMMARY OF THE INVENTION

To address the above first and second objects, there is provided an installation structure for a hydroelectric power generation apparatus according to a first aspect of the present invention, including a power generation apparatus accommodation frame body in which a plurality of hydroelectric power generation apparatuses are accommodated in parallel, a first wire having one end connected at least to a lower portion of the power generation apparatus accommodation frame body, an anchor or a weight connected with the other end of the first wire, a buoyancy body provided on an upper side of the hydroelectric power generation apparatus accommodation frame body through the second wire, the hydroelectric power generation apparatus accommodation frame body having an upper side thereof opened, and having a dividing plate between both side plates thereof to form a plurality of power generation apparatus accommodation units, each of the plurality of power generation apparatus accommodation units having a running water inlet side window formed at a front portion thereof, and having a running water outlet side window formed at a rear portion thereof.

To address the above first to third objects, there is provided the installation structure for the hydroelectric power generation apparatus according to a second aspect of the present invention, wherein the first wire includes a lower side wire having one end secured to both sides of a front portion at a lower side of the power generation apparatus accommodation frame body, and having the other end secured to the anchor or the weight, and an upper side wire having one end secured to both sides of a front portion at an upper side of the power generation apparatus accommodation frame body, and having the other end secured to a midpoint of the lower side wire.

According to the first aspect of the invention, since the hydroelectric power generation apparatuses are accommodated in parallel in the power generation apparatus accommodation frame body, they may be small. Also, since the frame accommodating the plurality of hydroelectric power generation apparatuses is large, its position can be kept horizontal. In addition, accommodating a plurality of hydroelectric power generation apparatuses makes it possible to generate a large quantity of power efficiently.

The buoyancy body is provided on an upper side of the power generation apparatus accommodation frame body. Accordingly, the power generation apparatus accommodation frame body accommodating the plurality of hydroelectric power generation apparatuses can be installed in the sea or other body of water. Rotating momentum of the power generation apparatus accommodation frame body due to the fluid pressure in the water flow direction is prevented by the tensions of the first lower side wires attached to the power generation apparatus accommodation frame body. Consequently, the channel entrance of the hydroelectric power generation apparatus is adjusted so as to be substantially horizontal. Swinging motion to the left or right of the power generation apparatus accommodation frame body due to the water flow direction is prevented by the buoyancy of the buoyancy body 70, so that the position of the frame is stabilized.

Additionally, the hydroelectric power generation apparatuses are used while accommodated in parallel in the power generation apparatus accommodation frame body. This enables the installation of the power generation apparatus accommodation frame body such that the hydroelectric power generation apparatuses the channels of which are shortened are balanced perpendicular to water flow. In addition, the hydroelectric power generation apparatuses and their respective generators may be integrated. However, since the power generation apparatus accommodation frame body has a plurality of power generation apparatus accommodating parts, the generator may be independent of the hydroelectric power generation apparatuses and some of the power generation apparatus accommodation units may be used to accommodate the generators. Accordingly, there is an economical advantage in that the need to provide a generator for each hydroelectric power generation apparatus is obviated.

According to claim 2, in addition to the various advantages of the invention of claim 1, the upper sides of the power generation apparatus accommodation units 38 of the power generation apparatus accommodation frame body 30 are opened. Accordingly, attaching, for example, hooked fittings to the upper surface of each hydroelectric power generation apparatus 20 facilitates its maintenance since any hydroelectric power generation apparatus 20 requiring maintenance may be lifted and conveyed onto the ground to perform maintenance there.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE PREFERRED EMBODIMENTS

At least the following details will become apparent from descriptions of this specification and of the accompanying drawings.

An installation structure for a hydroelectric power generation apparatus according to an embodiment of the present invention will now be described with reference to FIGS. 1 to 4. The present embodiment uses a power generation apparatus accommodation frame body 30 shown in FIG. 4. A plurality of hydroelectric power generation apparatuses 20 (six hydroelectric power generation apparatuses in this embodiment) can be accommodated in parallel in the power generation apparatus-accommodation frame body 30 from above. Secured on the front and rear portions of a horizontally long bottom plate 31 are lower restricting plates 32 and 33, which restrict the forward and backward directions of the lower part of the hydroelectric power generation apparatus 20. Side plates 34 the four corners of which are notched in a rectangular form are fixed onto each side of the bottom plate 31 and on the lower restricting plates 32 and 33. Fixed on the front and rear portions of the side plates 34 are upper-side restricting plates 35 and 36, which restrict the forward and backward directions of the upper part of the hydroelectric power generation apparatus 20. The bottom plate 31, side plates 34, lower-side restricting plates 32 and 33 and upper-side restricting plates 35 and 36 form a structure the upper side of which is opened and the front and rear of which are opened in a horizontally rectangular shape. The space between the side plates 34 is divided by five dividing plates 37 secured on the bottom plate 31 such that the six power generation apparatus accommodation units 38 are defined. Thus, six running water inlet side windows 39 are formed on the front side, and running water outlet side windows 40 are formed on the rear side so as to correspond to the running water inlet side windows.

Figure 1:
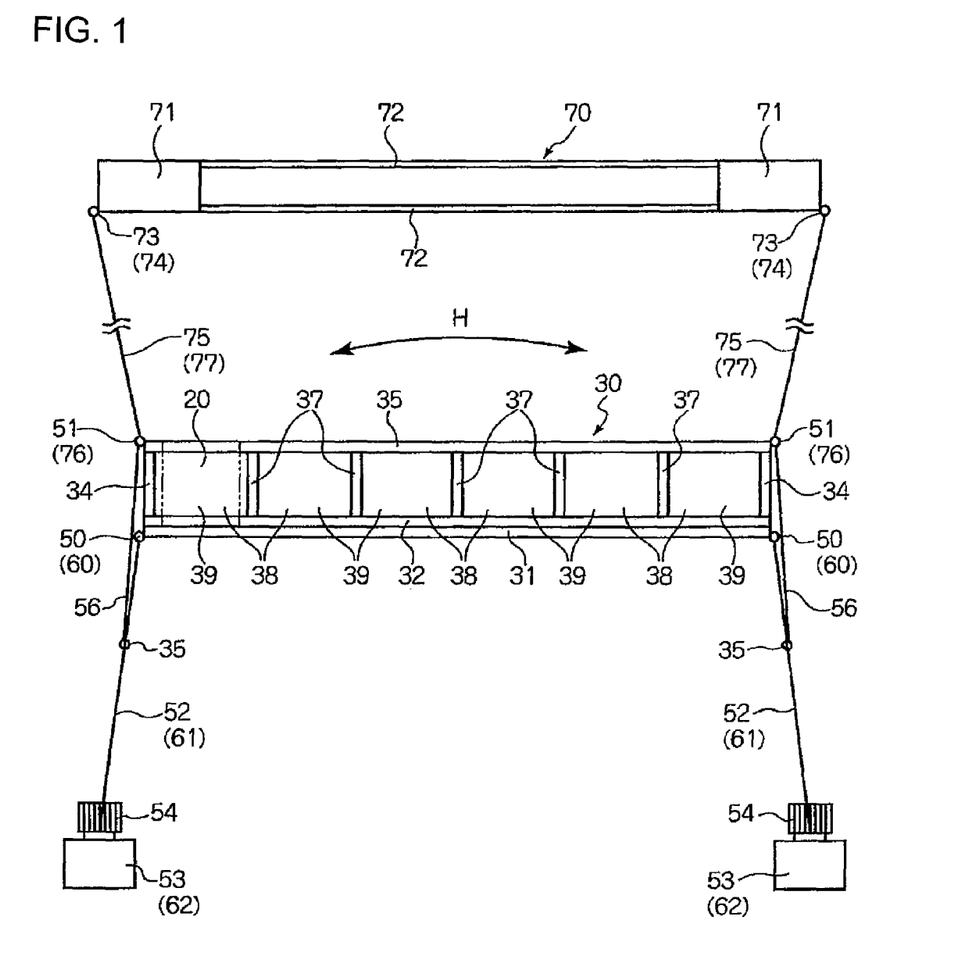
FIG. 1 is a front view of an installation structure for a hydroelectric power generation apparatus according to one embodiment of the invention.
Figure 2:
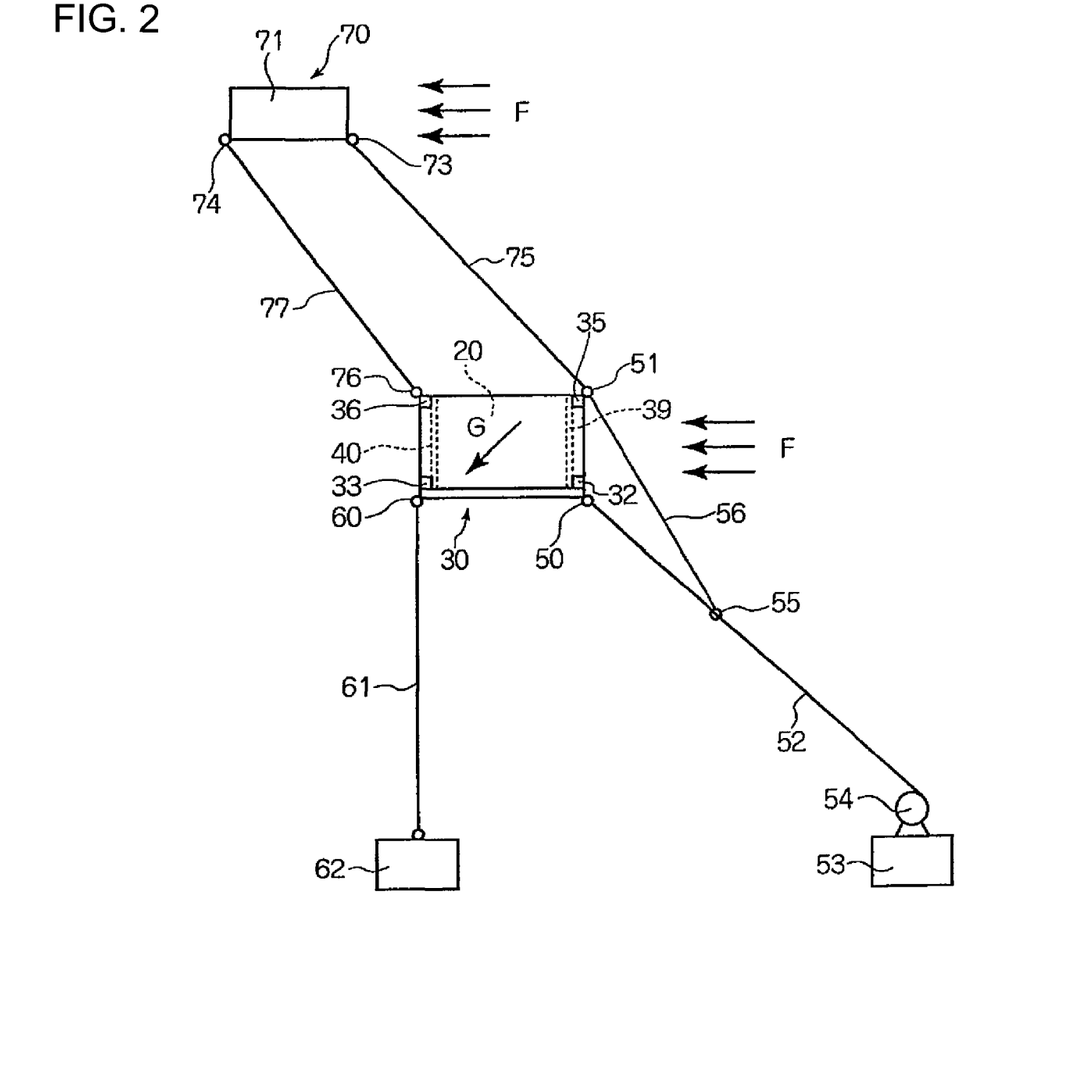
FIG. 2 is a side view of FIG. 1.
Figure 3:
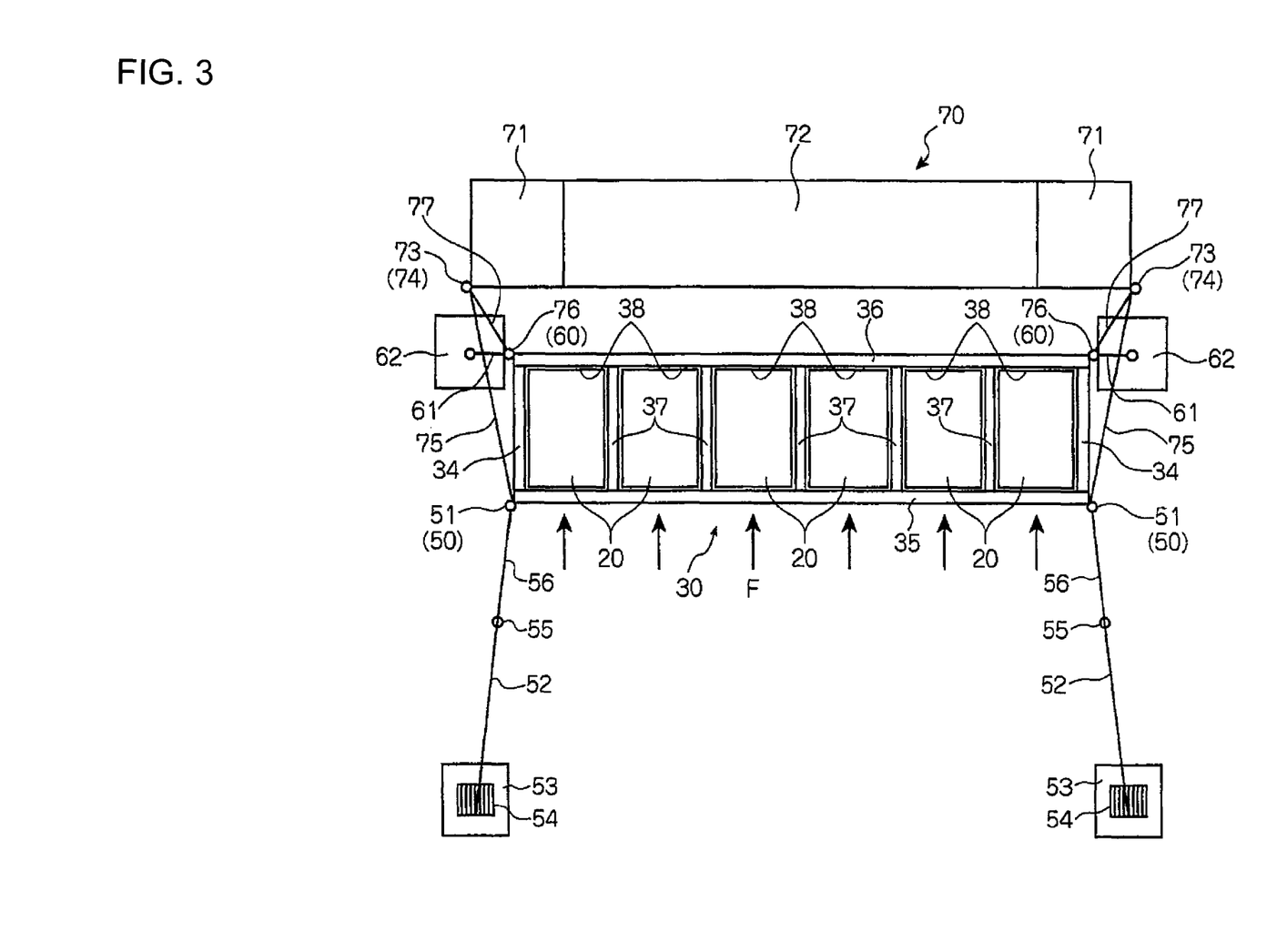
FIG. 3 is a plan view of FIG. 1.
Figure 4A:
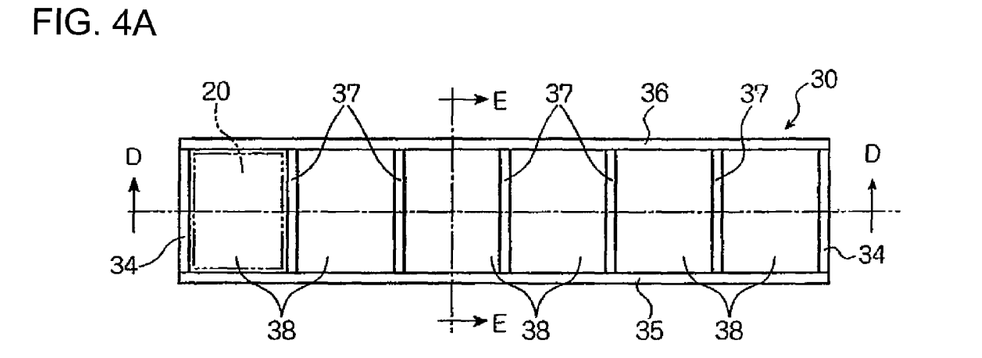
FIG. 4A is a plane view of a power generation apparatus accommodation frame body.
Figure 4B:
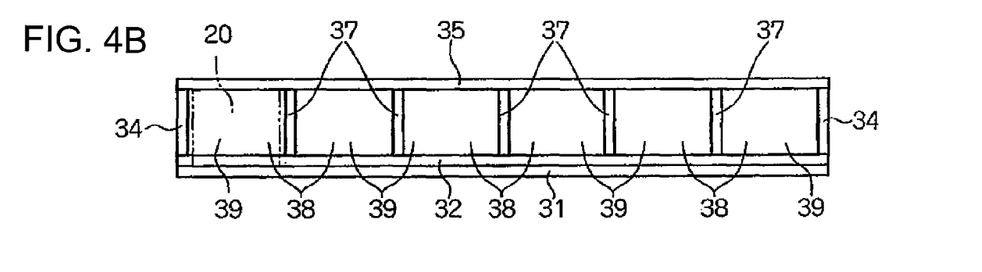
FIG. 4B is a front view of the power generation apparatus accommodation frame body.
Figure 4C:
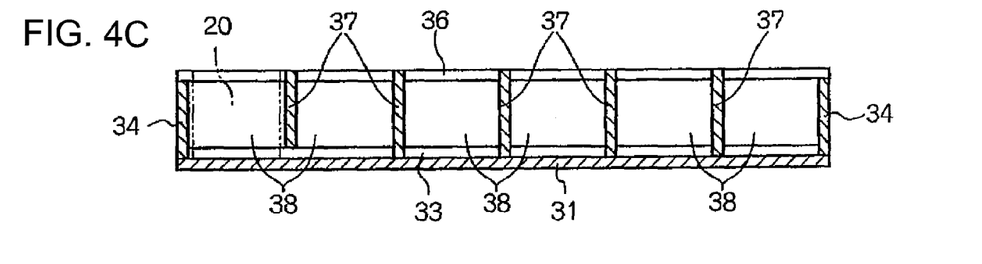
FIG. 4C is a sectional view of the power generation apparatus accommodation frame body, taken along the line D-D of FIG. 4A.
Figure 4D:
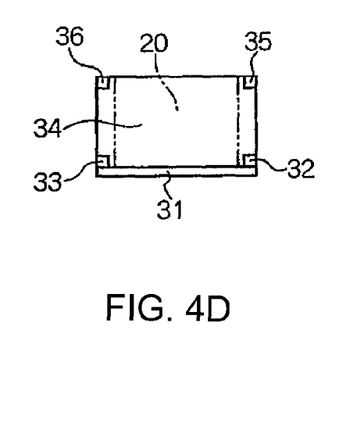
FIG. 4D is a side view of the power generation apparatus accommodation frame body.
Figure 4E:
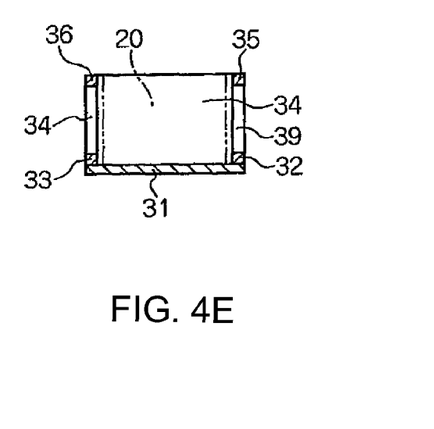
FIG. 4E is a sectional view of the power generation apparatus accommodation frame body, taken along the line E-E of FIG. 4A.

As shown in FIGS. 1 to 3, wire attaching devices 50 are fixed to the lower side of the front portion of the power generation apparatus accommodation frame body 30, and wire attaching devices 51 are attached to the upper side thereof. One end of each of the front-portion lower side wires is secured to the wire attaching device 50, and the other end of the front-portion lower side wire 52 is secured to a wire take-up device 55 fixed by a corresponding anchor or weight 53. A wire attaching device 55 is fixed near the midpoint of each front-portion lower side wire 52. A front-portion upper side wire 56 is secured between each wire attaching device 51 and corresponding wire attaching device 55. In this case, each front-portion upper side wire 56 has such a length that, with the anchor or the weight 53 installed in the sea- or river-bottom and the hydroelectric power generation apparatuses 20 accommodated in the power generation apparatus accommodation units 38 of this frame 30, the front portion of the power generation apparatus accommodation frame body 30 is substantially vertical, that is, the channel entrance of the hydroelectric power generation apparatus 20 is horizontal.

Wire attaching devices 60 are secured to the lower side of the rear portion of the power generation apparatus accommodation frame body 30. One end of each rear-portion lower side wire 61 is secured to each wire attaching device 60, and the other end of the rear-portion lower side wire 61 is secured to a corresponding anchor or weight 62.

A buoyancy body 70 is provided on an upper side of the power generation apparatus accommodation frame body 30. The buoyancy body 70 is prepared such that the upper parts and lower parts of the insides of the buoyancy tanks 71 filled with air or gas are fixed by corresponding connecting plates 72. Needless to say, the buoyancy body 70 does not have to be formed from the buoyancy tanks 71 and the connecting plates 72, but may be formed from a single buoyancy tank as a whole. In this case, the buoyancy of the buoyancy tanks 71 must be designed such that when the power generation apparatus accommodation frame body 30 accommodating hydroelectric power generation apparatuses 20 in its power generation apparatus accommodation units 38 is thrown into the sea or water, they do not sink to the bottom of sea or river.

Wire attaching devices 73 are attached to the front-portion lower sides of the buoyancy tanks 71, and wire attaching devices 74 are attached to the rear-portion lower sides thereof. One end of each front-portion lower side wire 75 is secured to the corresponding wire attaching device 73, and the other end of each front-portion lower side wire 75 is secured to the corresponding wire attaching device 51 fixed to the power generation apparatus accommodation frame body 30. Wire attaching devices 76 are fixed to the upper side of the rear-portion of the power generation apparatus accommodation frame body 30. One end of each rear-portion upper side wire 77 is secured to the corresponding wire attaching device 74, and the other end of the rear-portion upper side wire 77 is secured to the corresponding wire attaching device 76.

Next, the operation will be described. The hydroelectric power generation apparatuses 20 are accommodated in power generation apparatus accommodation units 38 from above the power generation apparatus accommodation frame body 30 so that the flowing-water inlets of the hydroelectric power generation apparatuses 20 are oriented towards the corresponding flowing-water inset windows 39. Then, the anchors 53 or the weights 59 are installed on the bottom of sea or river that is comparatively shallow and near a quay, and such that the running water inlet side windows 39 of the power generation apparatus accommodation frame body 30 are oriented in the direction of water flow F. Then, using the wire take-up devices 54, the lengths of the front-portion lower side wires 53 are adjusted by taking up or loosening the wires 52 so as to install the power generation apparatus accommodation frame body 30 at the depth where the flow velocity is highest and no obstacle may be caused to sea or water transport.

Thus, since the hydroelectric power generation apparatuses 20 are accommodated in parallel in the power generation apparatus accommodation frame body 30, they may be small. Also, since this frame 30 accommodating the plurality of hydroelectric power generation apparatuses 20 is large, its position can be kept horizontal. In addition, accommodating a plurality of hydroelectric power generation apparatuses makes it possible to generate a large quantity of power efficiently.

Additionally, the hydroelectric power generation apparatuses 20 are used while accommodated in parallel in the power generation apparatus accommodation frame body 30. This enables the installation of the power generation apparatus accommodation frame body 30 such that the hydroelectric power generation apparatuses 20 the channels of which are shortened are balanced perpendicular to water flow. In addition, the hydroelectric power generation apparatuses 20 and their respective generators may be integrated. However, since the power generation apparatus accommodation frame body 30 has a plurality of power generation apparatus accommodation units 38, the generator may be independent of the hydroelectric power generation apparatuses and some of the power generation apparatus accommodation units 38 may be used to store the generators. Accordingly, there is an economical advantage in that the need to provide a generator for each hydroelectric power generation apparatus 20 is obviated.

The buoyancy body 70 is attached to the buoyancy tanks 71 through the front-portion lower side wires 75 and rear-portion lower side wires 77. Accordingly, the power generation apparatus accommodation frame body 30 accommodating the plurality of hydroelectric power generation apparatuses can be installed in the sea or other body of water. Rotating momentum of the power generation apparatus accommodation frame body 30 in the direction of arrow G (see FIG. 2) due to the fluid pressure in the water flow direction F is prevented by the tensions of the front-portion lower side wires 52 and front-portion upper intermediate wires 56 attached to the power generation apparatus accommodation frame body 30. Consequently, the channel entrance of the hydroelectric power generation apparatus 20 is adjusted so as to be substantially horizontal. Swinging motion H to the left or right (see FIG. 1) of the power generation apparatus accommodation frame body 30 due to the water flow direction F is prevented by the buoyancy of the buoyancy body 70, so that the position of the frame 30 is stabilized.

Rear-portion lower side wires 61 and the anchors or the weights do not have to be provided in particular. However, provision of the rear-portion lower side wires 61 and the anchors or the weights 62 prevents the rear portion of the power generation apparatus accommodation frame body 30 from swinging to left or right and accordingly stabilizes the position of the rear portion. Additionally, the buoyancy body 70 is attached to the power generation apparatus accommodation frame body 30 through the front-portion lower side wires 75 and rear-portion lower side wires 77, but the wires 75 or wires 77 alone would suffice. Also, in sea or river not used for water transport, the lengths of the front-portion lower side wires 75 and rear-portion upper side wires 77 may be set so that the buoyancy body 70 is located on the sea or the river surface. Needless to say, the buoyancy body 70 may alternatively be located under the surface of sea or river. As a matter of course, in sea or river which prevents water transport, the lengths of the front-portion lower side wires 75 and rear-portion upper side wires 77 must be set so that the buoyancy body 70 is located in the sea or the river.

The upper sides of the power generation apparatus accommodation units 38 of the power generation apparatus accommodation frame body 30 are opened. Accordingly, attaching, for example, hooked fittings to the upper surface of each hydroelectric power generation apparatus 20 facilitates its maintenance since any hydroelectric power generation apparatus 20 requiring maintenance may be lifted and conveyed onto the ground to perform maintenance there.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An installation structure for a hydroelectric power generation apparatus, comprising:
    a power generation apparatus accommodation frame body in which a plurality of hydroelectric power generation apparatuses are accommodated in parallel;
    a first wire having one end connected at least to a lower portion of the power generation apparatus accommodation frame body;
    an anchor or a weight connected with the other end of the first wire;
    a buoyancy body provided on an upper side of the hydroelectric power generation apparatus accommodation frame body connected by a second wire where one end of said second wire is connected to said buoyancy body and the other end of said second wire is connected to an upper portion of the power generation apparatus accommodation frame body,
    the hydroelectric power generation apparatus accommodation frame body having an upper side thereof opened, and having a dividing plate between both side plates thereof to form a plurality of power generation apparatus accommodation units,
    each of the plurality of power generation apparatus accommodation units having a running water inlet side window formed at a front portion thereof, and having a running water outlet side window formed at a rear portion thereof.

2. The installation structure for the hydroelectric power generation apparatus according to claim 1, wherein the first wire includes:
    a lower side wire having one end secured to both sides of a front portion at a lower side of the power generation apparatus accommodation frame body, and having the other end secured to the anchor or the weight; and
    an upper side wire having one end secured to both sides of a front portion at an upper side of the power generation apparatus accommodation frame body, and having the other end secured to a midpoint of the lower side wire.

* * * * *